United States Patent [19]
Nishimura et al.

[11] Patent Number: 5,926,910
[45] Date of Patent: Jul. 27, 1999

[54] BLOWER PIPE

[75] Inventors: Masanori Nishimura; Giichi Iida, both of Tokyo, Japan

[73] Assignee: Kioritz Corporation, Tokyo, Japan

[21] Appl. No.: 08/879,316

[22] Filed: Jun. 19, 1997

[30] Foreign Application Priority Data

Jun. 21, 1996 [JP] Japan ................................. 8-162115

[51] Int. Cl.$^6$ ........................................................ A47L 9/08
[52] U.S. Cl. ............................................ 15/415.1; 15/405
[58] Field of Search ................................... 15/405, 415.1

[56] References Cited

U.S. PATENT DOCUMENTS

| | | |
|---|---|---|
| 2,586,145 | 2/1952 | Breuer et al. ................... 15/405 X |
| 4,413,371 | 11/1983 | Tuggle et al. ....................... 15/405 |
| 4,945,604 | 8/1990 | Miner et al. . |
| 5,054,159 | 10/1991 | Richardson . |
| 5,440,781 | 8/1995 | Kitazawa et al. . |
| 5,652,995 | 8/1997 | Henke et al. ................... 15/405 X |
| 5,689,852 | 11/1997 | Svoboda et al. ................... 15/405 |
| 5,768,749 | 6/1998 | Ohi et al. ............................. 15/405 |

*Primary Examiner*—Chris K. Moore
*Attorney, Agent, or Firm*—Chapman and Cutler

[57] ABSTRACT

A blower pipe is disclosed which is substantially prevented from being damaged, which is easily applicable even to a varied operation site to thereby attain improved operating characteristics, and which can be produced at a reduced cost. The blower pipe (31) is utilized in a power blower, and has its upstream end formed into proximal connecting means (33) and its downstream end formed into a blow-off opening (32), and has its bottom portion (36) provided with an arc-shaped expanded portion (34) in the vicinity of the blow-off opening (32).

5 Claims, 4 Drawing Sheets

BLOWER PIPE

BACKGROUND OF THE INVENTION

1. Field of the Invention

The present invention relates to a power working machine such as power blower for which utilizes a high speed air stream blown off by a blower to perform scavenging operation or the like. In particular, it relates to a blower pipe which is connected to an air blow-off port of such a power working machine.

2. Description of the Prior Art

A power working machine, such as a power blower, of this type comprises a machine body, a prime mover such as a small-sized internal combustion engine and a blower fan driven by the prime mover which are disposed in the machine body, and a blower pipe attached to the machine body. The blower fan is rotated by driving force of the prime mover to generate compressed air by the rotation, and the compressed air is blown off as a high speed air stream from a distal end of the blower pipe toward the ground or the like. By means of the high speed air stream thus blown off, fallen leaves, refuse, etc. are drifted together to perform scavenging operation or the like.

A power working machine, such as a power blower, as described above is used while being held by operator's hand or suspended from operator's shoulder. Accordingly, the blower pipe has its blow-off opening-provided portion upwardly bent at an appropriate angle so as to blow off the high speed air stream in parallel with a scavenging site such as the ground through the blower pipe. The high speed air stream passes through the bent portion while undergoing changes in its direction of current, and thus the reaction force resulting therefrom is exerted on the blower pipe to press the distal end portion of the blower pipe against the ground or the like. This renders movement of the blower pipe extremely hard and retards rapid operation.

With respect to such conventional blower pipes as described above, there have heretofore been proposed one wherein a wheel is fixedly mounted on its bottom portion in the vicinity of its blow-off opening for a high speed air stream, and one having its bottom portion provided with a brush in the vicinity of its blow-off opening for a high speed air stream. In any of these blower pipes, however, the vicinity of the blow-off opening thereof is liable to be subjected to concentrated load and thus susceptible to damage, and yet, the use of the additional member such as the wheel or the brush inevitably leads to a high cost.

SUMMARY OF THE INVENTION

The present invention has been made in view of the above described problems. It is, therefore, an object of the present invention to provide a blower pipe which is substantially prevented from being damaged, which is easily applicable even to a varied operation site to thereby attain improved operating characteristics, and which can be produced at a reduced cost.

To attain the above object, the blower pipe of the present invention has a bent shape, and has its upstream end provided with proximal connecting means for connecting to a blowing barrel for a high speed air stream and has its bottom portion provided with an expanded portion in the vicinity of an blow-off opening at its downstream end. Accordingly, the blower pipe is constructed such that pressing force caused by the high speed air stream, which would otherwise press the blow-off opening portion against the ground or the like, is absorbed via the expanded portion. In a preferred embodiment, the blow-off opening is formed into an oblong shape. It is preferred that the blower pipe is integrally provided with the expanded portion.

The blower pipe according to the present invention which is constructed as described above is tightly connected to a high speed air stream blowing barrel of a power working machine such as a power blower. In operation of the power working machine such as a power blower, the power working machine is actuated to generate a compressed air stream, and a high speed air stream is blown off through inner paths of the high speed air stream blowing barrel and the blower pipe (or through an inner path of the blower pipe) toward the ground or the like, and the power working machine is operated with its machine body held by operator's hand or suspended from operator's shoulder to drift fallen leaves, refuse and the like together, thereby performing scavenging operation.

During the operation, strong vibrations are transmitted to the blower pipe. However, the vibrations are absorbed via the entire bottom surface of the expanded portion formed in the vicinity of the blow-off opening of the blower pipe. Consequently, repeated loads and the like caused by the vibrations are not concentrated. By virtue of this, the vicinity of the blow-off opening of the blower pipe is not susceptible to damage. Further, the use of the specific connecting means prevents the blower pipe from accidentally coming off by the vibrations or the like.

DESCRIPTION OF THE PREFERRED EMBODIMENT

In the following, an embodiment of the present invention will be described with reference to the accompanying drawings.

Figure 1:
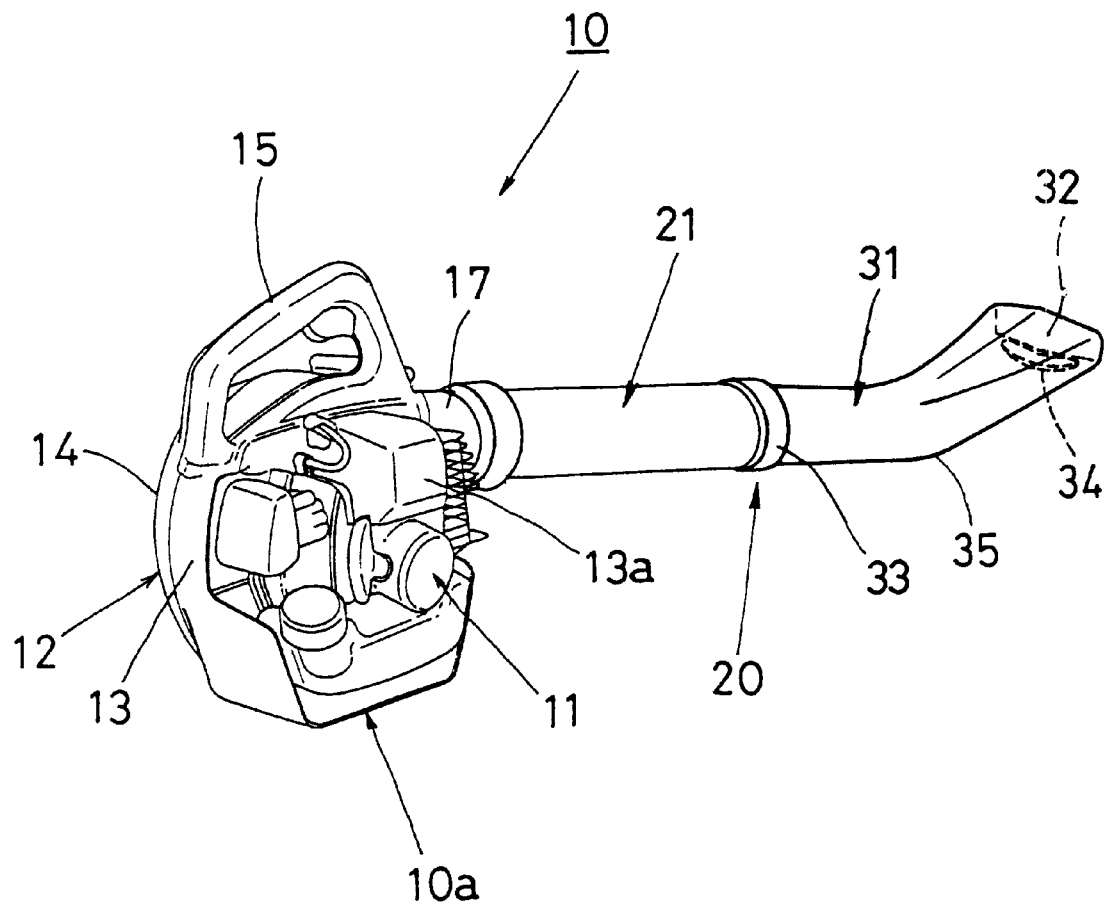
FIG. 1 is a schematic perspective view of a power blower employing one embodiment of the blower pipe according to the present invention.

FIG. 1 is a general perspective view of a power blower 10 as a power working machine on which a blower pipe of this embodiment is mounted. The power blower 10 comprises a machine body 10a and a blower pipe portion 20. As a prime mover, an internal combustion engine 11 such as a small air-cooled two-cycle gasoline engine is disposed near one side of the machine body 10a. Opposite to the internal combustion engine 11, a centrifugal blower fan (not shown) is disposed near the other side of the machine body 10a. The blower fan is operatively connected to the internal combustion engine 11 so as to be rotationally driven thereby.

The machine body 10a is formed as a cover 12, and the cover 12 is composed of right and left bisectional cover members 13, 14. The right cover member 13 has its shell portion integrally provided with a cylinder cover 13a for covering a cylinder of the internal combustion engine 11. The cover members 13, 14 have their upper junctional portions integrally provided with counter-halves of a hollow handle 15, which is formed by joining the counter-halves together.

The left cover member 14 is so formed as to cover the blower fan, and in its center portion, it is provided with air-intake vents (not shown) for introducing external air to the blower fan disposed in the cover member 14. On the other hand, the machine body 10a is provided with an air blowing barrel 17 which is formed by joining the right and left cover members 13, 14. It is designed that air taken from the air-intake vents of the left cover member 14 is compressed and urged toward the air blowing barrel 17 by means of the blower fan. To the air blowing barrel 17 of the machine body 10a, the blower pipe portion 20 is detachably attached. The blower pipe portion 20 comprises an intermediate blower pipe 21 equipped with a muffler and a blower pipe 31.

The intermediate blower pipe 21 equipped with the muffler and the blower pipe 31 are detachably connectable to each other. When the power blower 10 is used, the upstream end of the intermediate blower pipe 21 equipped with the muffler is fitted to the air blowing barrel 17 of the machine body 10a, and the upstream end of the blower pipe 31 is fitted to the downstream end of the intermediate blower pipe 21 equipped with the muffler. An air stream compressed and urged to the air blowing barrel 17 by means of the blower fan is caused to pass through the blower pipe portion 20. The air stream is blown off through an oblong blow-off opening 32 formed at the downstream end of the blower pipe 31 via a bent portion 35 of the blower pipe 31. By means of the air stream thus blown off, fallen leaves and the like are drifted together to perform scavenging operation. In this connection, an arc-shaped expanded portion 34 formed in a bottom portion 36 in the vicinity of the blow-off opening 32 and extending in the transverse direction keeps the blow-off opening 32 and the bottom portion 36 at a level raised from an operation surface such as the ground in an appropriate amount. This prevents the blower pipe 31 provided with the blow-off opening from being pressed against the operation surface to otherwise cause difficulty in movement due to reaction force of the air stream passing through the bent portion 35 at a high speed, thereby enabling smoothing of operation such as scavenging to be realized.

Figure 2:
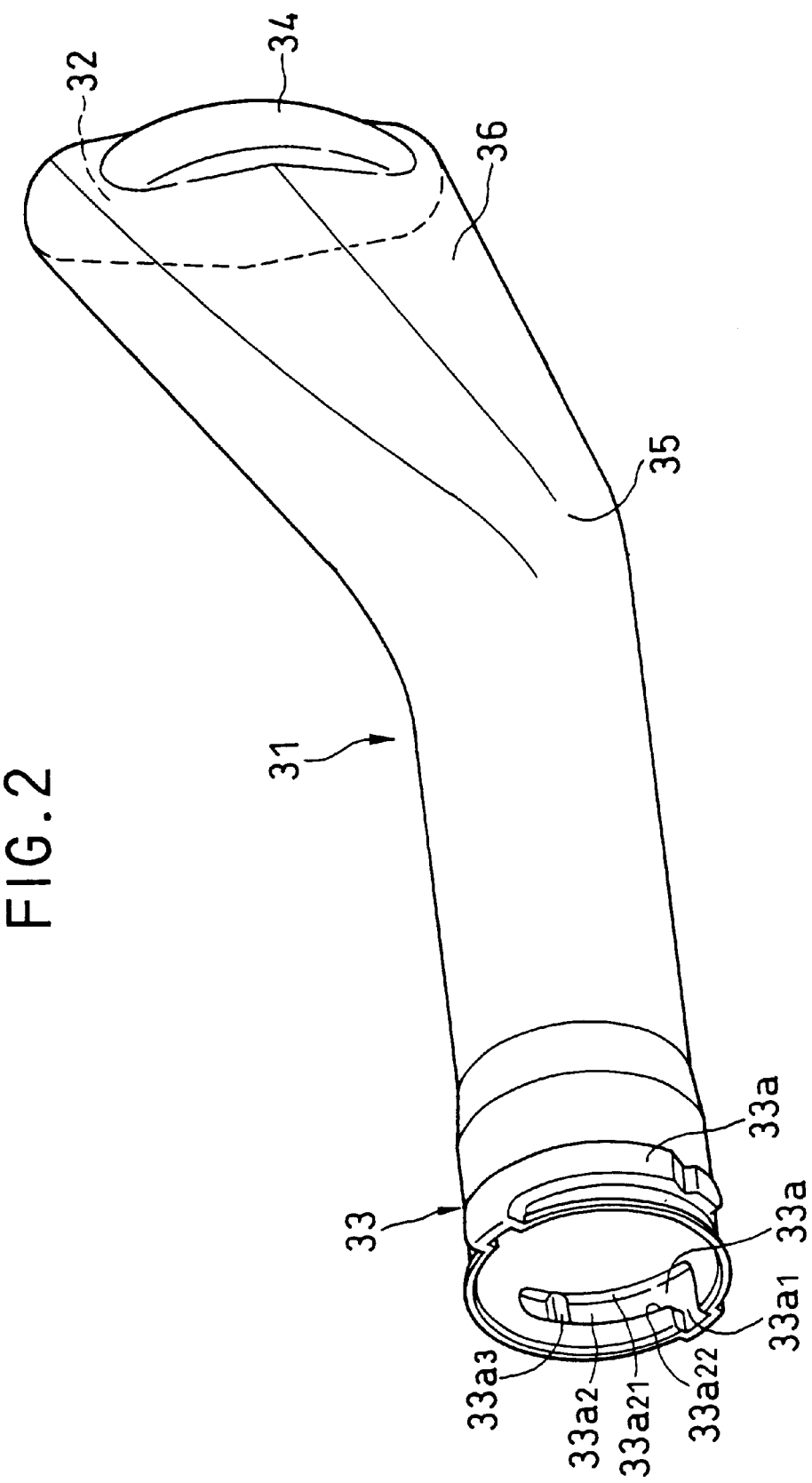
FIG. 2 is a perspective view of the blower pipe shown in FIG. 1, wherein the blower pipe is viewed from the side of the bottom portion.

FIG. 2 shows the blower pipe 31 provided with the blow-off opening 32 in detail. The blower pipe 31 with the blow-off opening 32 has its upstream end formed into a proximal fitting portion 33 as connecting means for tightly connecting the blower pipe 31 to the intermediate blower pipe 21 equipped with the muffler and its downstream end formed into the oblong blow-off opening 32 parallel to the operation surface. At an appropriate position between the proximal fitting portion 33 and the oblong blow-off opening 32, the blower pipe 31 is upwardly bent at an appropriate angle, and from the bent portion 35 to the oblong blow-off opening 32, it is gradually depressed. The angle at the bent portion 35 and the oblong shape of the blow-off opening 32 is so designed as to enable an operator to easily apply the high speed air stream to subject to be scavenged such as fallen leaves while holding the machine body by operator's hand or by suspending it from operator's shoulder.

In the vicinity of the oblong blow-off opening 32, the bottom portion 36 of the blower pipe 31 with the blow-off opening 32 is integrally provided with the semilunar expanded portion 34 extending in the transverse direction to appropriately space the bottom portion 36 and the blow-off opening 32 apart from the surface of operation such as scavenging. This enables smooth operation of the power blower 10 to be realized.

The proximal fitting portion 33 formed at the upstream end opposite to the oblong blow-off opening 32 is integrally provided with two substantially L-shaped locking grooves 33a, 33a opposite to each other which are angularly spaced 180 degrees apart and outwardly protruded from the blower pipe 31. Each of the locking grooves 33a, 33a comprises a longitudinal portion $33a_1$ extending to the upstream end of the fitting portion 33 in the longitudinal direction of the blower pipe 31 and a circumferential portion $33a_2$ circumferentially extending from the longitudinal portion $33a_1$, at right angles thereto. The circumferential portion $33a_2$ is a groove having a width widening from its innermost and a stopper ridge $33a_3$ is formed in midway of the circumferential portion $33a_2$.

Figure 3:
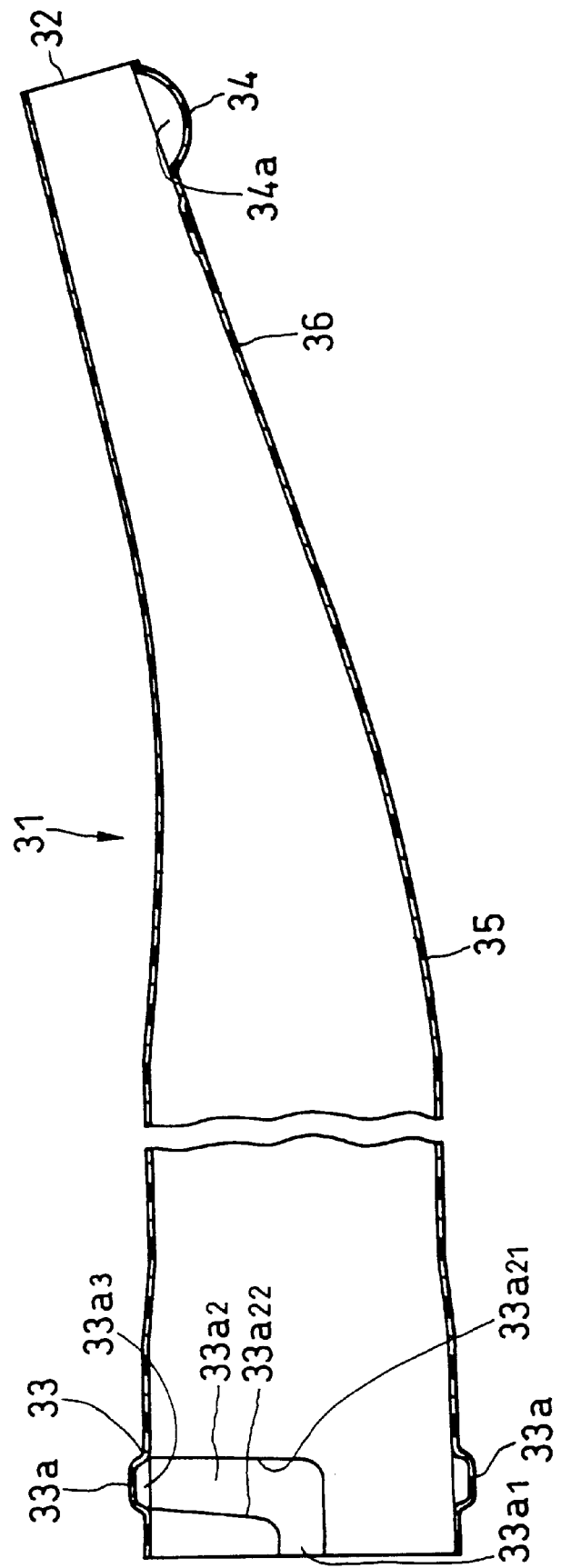
FIG. 3 is a longitudinal vertical section of the blower pipe shown in FIG. 2.

FIG. 3 is a view showing a longitudinal vertical section of the blower pipe 31. The proximal fitting portion 33, whose diameter is slightly enlarged for receiving a distal fitting portion of the blower pipe 21 equipped with the muffler, is integrally formed with a pair of the substantially L-shaped locking grooves 33a, 33a each of which is outwardly protruded from the blower pipe 31 with the blow-off opening 32 and each of which comprises the longitudinal portion $33a_1$ and the circumferential portion $33a_2$ extending at right angles thereto. The circumferential portion $33a_2$ has two constituent sides $33a_{21}$, $33a_{22}$, one $33a_{21}$ of which is distal to its entrance and the other $33a_{22}$ is proximal to the entrance. The one $33a_{21}$ is perpendicular to the longitudinal portion $33a_1$, and the other $33a_{22}$ is so slanted as to gradually approximate toward the terminal of the one $33a_{21}$. The blower pipe 31 is upwardly bent at an appropriate intermediate position and then gradually depressed to the oblong blow-off opening 32. In the bottom portion 36 in the vicinity of the oblong blow-off opening 32, the outwardly protruding expanded portion 34 is integrally formed.

Figure 4:
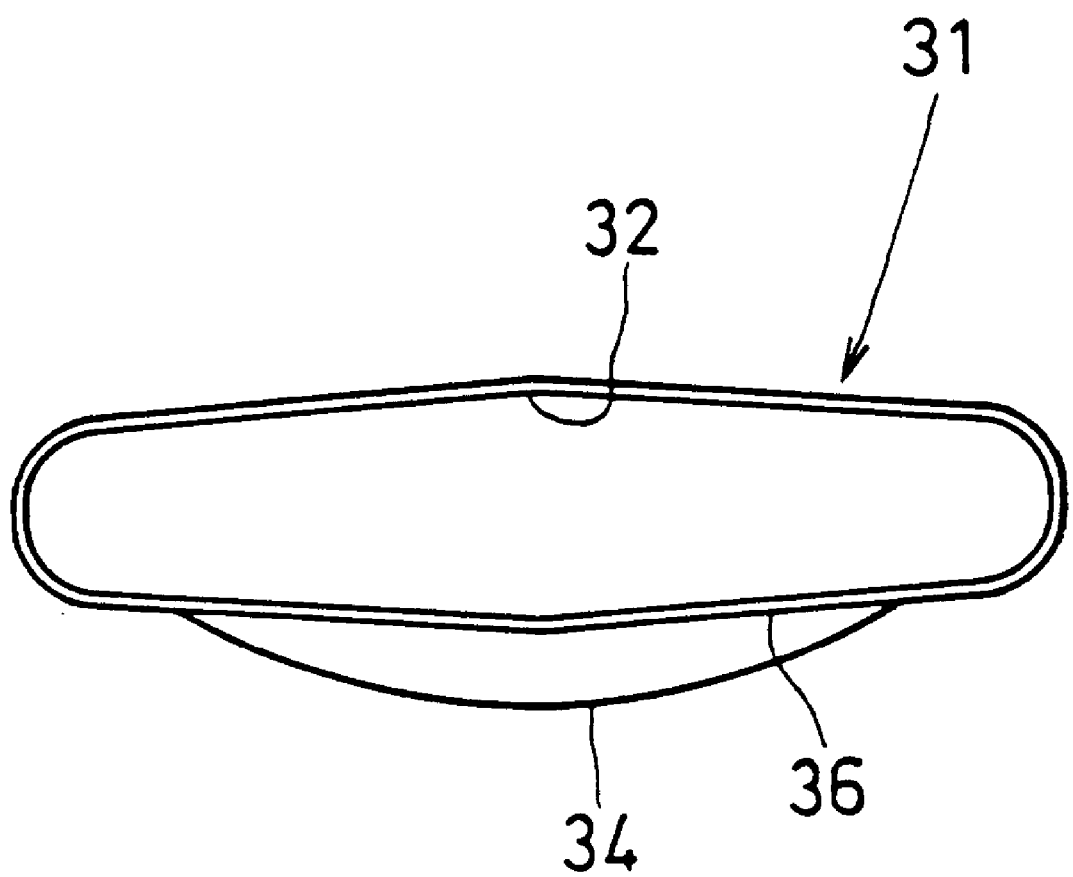
FIG. 4 is a front view of the blower pipe shown in FIG. 1, wherein the blower pipe is viewed from the side of the blow-off opening.

FIG. 4 is a front view of the oblong blow-off opening 32 and its vicinity, wherein the blower pipe 31 is viewed from the side of the oblong blow-off opening 32. Degree of the oblongness of the oblong blow-off opening 32 is appropriately determined according to a site of operation such as scavenging, subject to be scavenged such as fallen leaves, etc. In the vicinity of the oblong blow-off opening 32, the bottom portion 36 is integrally provided with the expanded portion 34 which serves as a slide skid for preventing the bottom portion 36 from being pressed against the operation surface so as not to impair operating characteristics of the power blower 10.

When the blower pipe 31 designed as described above is connected to the intermediate blower pipe 21 equipped with the muffler, the distal fitting portion (not shown) of the intermediate blower pipe 21 equipped with the muffler is fitted into the proximal fitting portion 33 of the blower pipe 31, and protruding pins (not shown), which are oppositely formed on the circumferential surface of the distal fitting portion and angularly spaced 180 degrees apart, are inserted into the longitudinal portions $33a_1$, $33a_1$ of the substantially L-shaped grooves 33a, 33a of the blower pipe 31 until the protruding pins abut upon the one constituent sides $33a_{21}$, $33a_{21}$ of the circumferential portions $33a_2$, $33a_2$ of the substantially L-shaped grooves 33a, 33a. Then, the blower pipe 31 is turned clockwise relative to the intermediate blower pipe 21 equipped with the muffler. The protruding pins formed on the distal fitting portion of the intermediate blower pipe 21 with the muffler are thereby caused to advance sliding along the slanted surfaces of the other constituent sides $33a_{22}$, $33a_{22}$ of the substantially L-shaped grooves 33a, 33a and to pass over the stopper ridges $33a_3$, $33a_3$ formed in the circumferential portions $33a_2$, $33a_2$. The protruding pins are locked at positions where they fit the groove widths of the circumferential portions $33a_2$, $33a_2$. By the advance of the protruding pins along the slanted surfaces of the other sides $33a_{22}$, $33a_{22}$, the distal fitting portion of the intermediate blower pipe 21 with the muffler is forced to fit into the proximal fitting portion 33 of the blower pipe 31. Consequently, tight connection therebetween is attained.

When a polyethylene, a polyethylene alloy or the like is used as a material to prepare the blower pipe 31, the material is melted and introduced into a mold having a desired shape, and air is blown thereinto to obtain an integrally molded product. In other words, the blower pipe 31 may be prepared by means of so-called blow molding method, thereby enabling reduced cost of the product to be realized.

In the above, the one embodiment of the present invention has been described in detail. It is, however, to be understood that the present invention is by no means restricted to the above-described embodiment and that various modification may be made without departing from the scope and spirit of the present invention as defined in the claims.

For example, in the above description, the circumferential portions of the substantially L-shaped grooves formed in the upstream end of the blower pipe are formed for use by clockwise turning the blower pipe. The circumferential portions may be formed for use by counterclockwise turning the blower pipe. Further, in the above description, the expanded portion is provided in the bottom in the vicinity of the oblong blow-off opening formed at the downstream end of the blower pipe. However, the position of the expanded portion provided in the bottom portion may be determined according to scavenging site and subject to be scavenged. Accordingly, the position is not restricted to the vicinity of the oblong blow-off opening. The expanded portion may appropriately be varied also in shape according to various conditions. Moreover, the blower pipe of the present invention may be connected directly to the blowing barrel of the power blower or via the intermediate blower pipe equipped with the muffler.

As can be understood from the above description, the blower pipe of the present invention is not susceptible to damage and is easily slidable on a surface of operation such as scavenging, even if pressing force caused due to blow-off of a high speed air stream through the oblong blow-off opening is exerted on the bottom portion of the blower pipe. Further, the blower pipe is extremely pliably applicable even to a varied operation surface and may be prepared at a reduced cost by employing blow molding method. Accordingly, if a power blower employing the blower pipe is used in scavenging or the like, high operational efficiency is attained.

What is claimed is:

1. A blower pipe for a power blower assembly, the pipe having an upper end adjacent the blower assembly and a lower, blow-out end, the pipe being bent between its ends at a selected angle so that the lower end extends generally horizontally when the blower assembly is held manually by a user, and wherein the upper end of said pipe further has a positive coupler assembly removably joining same to the blower assembly, and wherein the lower end of the pipe is formed with a blow-out opening and a convex ground-engaging surface spaced from the blow-out opening and formed to maintain said opening spaced above the ground and to ease the movement of the pipe about the ground during use.

2. The blower pipe according to claim 1, wherein said blow-out opening has an oblong shape and said convex surface has an arc-like shape.

3. The blower pipe according to claim 1, wherein said convex surface has a semilunar shape and extends in the transverse direction of said blow-out opening.

4. The blower pipe according to claim 1, wherein said coupler assembly has a proximal fitting which comprises a substantially L-shaped locking groove formed therein with a longitudinal portion extending to the upstream end of the fitting and a circumferential portion circumferentially extending from the longitudinal portion at substantially a right angle thereto.

5. The blower pipe according to claim 4, wherein said locking groove protrudes outwardly from said fitting.

* * * * *